Feb. 7, 1967  L. F. BENDER  3,302,911

PIPE HANGER

Filed June 20, 1966

INVENTOR:
LLOYD F. BENDER

BY: James E. Nilles
ATTORNEY.

United States Patent Office 3,302,911
Patented Feb. 7, 1967

3,302,911
PIPE HANGER
Lloyd F. Bender, Rte. 2, Hayward, Wis. 54843
Filed June 20, 1966, Ser. No. 558,677
2 Claims. (Cl. 248—59)

This invention relates to pipe hangers which support pipes of various types from the ceilings, walls or elsewhere.

Many types of prior art pipe hangers have heretofore been proposed and used but they have had some shortcomings and disadvantages, such as for example, the necessity for precise location on the supporting structure in order to be aligned with the pipe, the lack of adjustability and flexibility of arrangement which makes connection to the pipe difficult, the difficulty in making the actual connection or disconnection to the pipe itself, and the inability to quickly accommodate and adjust to pipes of various diameters and types of material such as glass or plastic.

Accordingly, it is an object of the present invention to provide an improved pipe hanger which overcomes the above mentioned shortcomings of the prior art. The hanger provided by the present invention is completely adjustable and need not be precisely located on the supporting structure in order to insure easy and quick alignment and fastening of the pipe; the present hanger can be quickly attached to the pipe and then adjusted to hold the pipe securely in place with only the proper amount of force; and the hanger can be mounted in any position, such as vertically or horizontally. By means of the present invention pipes of various materials such as rigid glass, flexible or rigid plastic, metal or other materials can be accommodated quickly, securely and without special emphasis being placed on the amount of clamping force required to hold the pipes or on the alignment of the hangers on the supporting structure.

These and other objects of the present invention will become apparent as this disclosure progresses, reference being had to the accompanying drawings in which.

Figure 1:
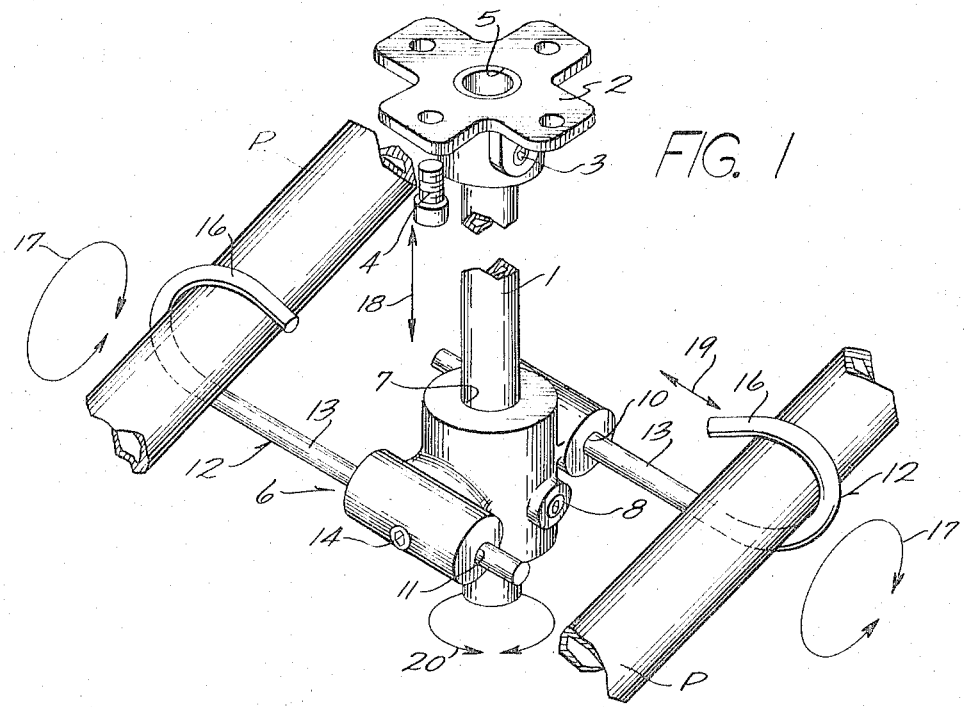
FIGURE 1 is a perspective view of a pipe hanger made in accordance with the present invention and showing it as being supported from an overhead support, certain parts being shown as broken away.
Figure 2:
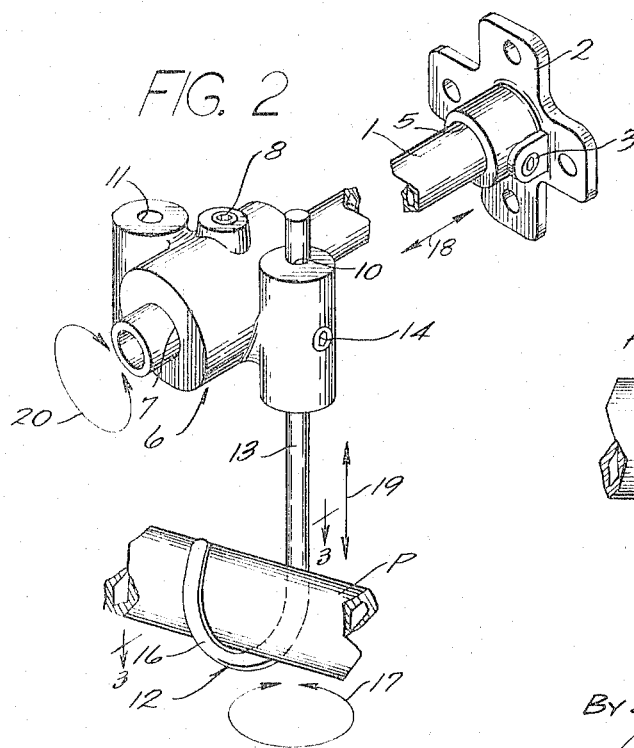
FIGURE 2 is a perspective view of the hanger shown in FIGURE 1 but positioned as being supported from a vertical wall and with one of the hook arms removed.

Referring in greater detail to the drawings, the pipe hanger provided by the present invention includes an elongated stem 1 which is circular in cross section and is rigidly and detachably secured in a mounting flange 2 by means of the Allen set screw 3. The mounting flange 2 can be secured to a supporting structure such as the ceiling of a building or to a side wall by means of screws 4, (only one shown). The position shown in FIGURE 1 illustrates its use when attached to an overhead structure (not shown), while FIGURE 2 illustrates the use of the invention as positioned when applied to a side, vertical wall (not shown) of a supporting structure. The stem is removable and adjustable in the mounting flange by being slidable and rotatable in the bore 5 which extends through the flange.

The pipe hanger also includes a housing 6 preferably formed from a metal casting, and a recess 7 extends through the housing by means of which it is slidable along the stem 1. A set screw 8 is threadably engaged in the housing and contacts the stem 1 to hold the housing in any selected position along the length of the stem.

The housing also has a pair of spaced apart apertures 10 and 11 extending through it and arranged in a direction which is generally normal to that in which the stem extends. These apertures are arranged one on each side of the stem and are each adapted to slidably receive a hook arm 12. These hook arms extend in opposite directions from one another.

The hook arms themselves include a straight stem portion 13 which is slidable in its respective aperture in the housing and the set screw 14 threadably engaged in the housing serves to contact the straight portion 13 and thus hold the hook arm in any selected position in the housing. It will be noted that the hook arms are also rotatably mounted in the housing.

The hook arms also include an outer, generally U-shaped hook 16 which embracingly receives a pipe P to be supported by the hanger. These U-shaped hooks 16 may be coated with a plastic material and this is desirable where pipes formed of rigid glass are to be supported.

Figure 3:
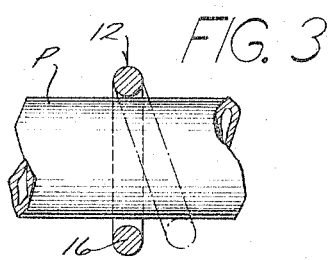
FIGURE 3 is a cross section, plan view, taken generally along line 3—3 in FIGURE 2 and showing the pipe embracing hook arm in full lines in a position before final adjustment, and in broken lines after final adjustment has been made.

In order to support the pipe in the hook arm, the pipe is placed in the hook arm when the latter is in the full line position shown in FIGURE 3. Alternatively, the pipe line may be an existing one already in location and in that case the hook arm is slipped over the pipe. In either event, after the pipe has been generally engaged by the U-shaped hook, the latter is rotated slightly as indicated by the curvilinear arrow 17 and for example, to the dotted line position shown in FIGURE 3 whereby the sides of the U-shaped hook snugly engage the opposite sides of the pipe, thus holding it securely in position.

As indicated by the double headed arrows 18 and 19, the housing can be adjustable along the length of the stem to give flexibility in one direction, while the hook arms can be adjusted in the housing itself in another direction. As indicated by the curvilinear arrow 20 the housing itself can be rotated on the stem for another adjustment. In this manner the necessity for precisely locating the mounting flange on the supporting structure is eliminated and this is particularly important where a rigid pipe line is to be supported or one such as glass which does not have any "give." After the pipe has been embraced by the U-shaped hooks the latter can be simply turned to securely hold the pipe and then locked in position by their rsepective set screws. The U-shaped hook arms can accommodate pipes which vary in diameter somewhat and thus additional flexibility of the hanger is provided. Any number of hangers can be used for a pipe installation and may be mounted in various positions as required.

Various modes of carrying out the invention are contemplated as being within the scope of the following claims particularly pointing out and distinctly claiming the subject matter which is regarded as the invention.

What I claim is:

1. An adjustable pipe hanger for supporting pipes in any one of a plurality of positions comprising, an elongated stem, means for rigidly securing said stem to a supporting structure, a housing having a recess extending therethrough in one direction, means for releasably securing said stem in said recess for adjustment of said housing along the length of said stem, said housing having a pair of spaced apart apertures extending therethrough and generally at a right angle to said recess, a hook-arm slidable in opposite directions in each of said apertures, and means for detachably locking said hook-arms in said aperture in any selected position to which they may be slid, said hook-arms each having an open and generally U-shaped hook at one of its ends for embracingly receiving a pipe to be supported thereby, said hook-arms also being rotatable in said housing whereby after said pipe is placed in said U-shaped hook the hook-arm can be rotated slightly to snugly embrace said pipe and then locked in said adjusted position.

2. A hanger as defined in claim 1 further characterized in that said stem is of round cross section and said housing is rotatably mounted on said stem for rotative adjustment to any desired position thereon.

References Cited by the Examiner
UNITED STATES PATENTS 2,045,307　　7/1936　　O'Connell _____ 248—59

CLAUDE A. LE ROY, *Primary Examiner.*